United States Patent
Glaab et al.

(10) Patent No.: US 10,403,153 B2
(45) Date of Patent: Sep. 3, 2019

(54) AUTONOMOUS EMERGENCY FLIGHT MANAGEMENT SYSTEM FOR AN UNMANNED AERIAL SYSTEM

(71) Applicant: U.S.A., as represented by the Administrator of the National Aeronautics and Space Administration, Washington, DC (US)

(72) Inventors: Patricia C. Glaab, Hampton, VA (US); Louis J. Glaab, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 258 days.

(21) Appl. No.: 15/397,140

(22) Filed: Jan. 3, 2017

(65) Prior Publication Data
US 2018/0114450 A1    Apr. 26, 2018

Related U.S. Application Data

(60) Provisional application No. 62/274,816, filed on Jan. 5, 2016.

(51) Int. Cl.
*G08G 5/00* (2006.01)
*G05D 1/00* (2006.01)
(Continued)

(52) U.S. Cl.
CPC ......... *G08G 5/0039* (2013.01); *B64C 39/024* (2013.01); *B64D 47/06* (2013.01);
(Continued)

(58) Field of Classification Search
None
See application file for complete search history.

(56) References Cited

U.S. PATENT DOCUMENTS 8,521,343 B2 *  8/2013  Spinelli ............... G05D 1/0676
                                                            701/17
8,996,207 B2    3/2015  Goossen et al.
(Continued)

FOREIGN PATENT DOCUMENTS

CN        103625649        7/2015
WO    2015101978 A1        7/2015

OTHER PUBLICATIONS

Eendebak P. T. et al., "Landing Spot Selection for UAV Emergency Landing," Proceedings of SPIE, Unmanned Systems Technology x XV, 2013, pp. 874105-1-9, vol. 8741.

(Continued)

*Primary Examiner* — Truc M Do
(74) *Attorney, Agent, or Firm* — Andrea Z. Warmbier; Robin W. Edwards; Mark P. Dvorscak

(57) ABSTRACT

An autonomous emergency flight management system may find safe and clear landing sites for unmanned aerial systems (UASs) in emergency situations. Emergency flight management software may reside on an onboard computing system. The computing system may continuously look at internal databases and input from other systems (e.g., a global positioning system (GPS), camera, compass, radar, sonar, etc.), depending on what is available. The emergency flight management system may make decisions on its own without human intervention. For instance, a database may provide some local likely candidates for landing sites. Information associated with the candidates may include latitude, longitude, altitude for top of a building, etc. Position updates may be continuously provided from an autopilot or other suitable system.

20 Claims, 7 Drawing Sheets

(51) Int. Cl.
  *G01C 23/00* (2006.01)
  *B64D 47/06* (2006.01)
  *B64C 39/02* (2006.01)
  *G08G 5/02* (2006.01)
  *G05D 1/06* (2006.01)
  *B64D 45/00* (2006.01)

(52) U.S. Cl.
  CPC .......... *G01C 23/00* (2013.01); *G05D 1/0055* (2013.01); *G05D 1/0088* (2013.01); *G05D 1/0676* (2013.01); *G08G 5/0056* (2013.01); *G08G 5/0069* (2013.01); *G08G 5/025* (2013.01); *B64C 2201/042* (2013.01); *B64C 2201/141* (2013.01); *B64C 2201/145* (2013.01); *B64D 45/00* (2013.01)

(56) References Cited

U.S. PATENT DOCUMENTS

| | | | | |
|---|---|---|---|---|
| 9,310,222 | B1* | 4/2016 | Suiter | G01C 23/005 |
| 9,646,502 | B1* | 5/2017 | Gentry | G08G 5/0039 |
| 10,049,589 | B1* | 8/2018 | Boyd | G05D 1/101 |
| 2008/0023587 | A1* | 1/2008 | Head | B64G 1/10 |
| | | | | 244/158.4 |
| 2009/0306840 | A1* | 12/2009 | Blenkhorn | G05D 1/0676 |
| | | | | 701/16 |
| 2013/0179011 | A1* | 7/2013 | Colby | G01C 21/20 |
| | | | | 701/16 |
| 2014/0142787 | A1* | 5/2014 | Tillotson | G05D 1/101 |
| | | | | 701/3 |
| 2014/0297068 | A1* | 10/2014 | Revell | G06K 9/00637 |
| | | | | 701/16 |
| 2014/0343765 | A1* | 11/2014 | Suiter | G08G 5/0056 |
| | | | | 701/18 |
| 2016/0086497 | A1* | 3/2016 | Williams | G06K 9/0063 |
| | | | | 701/16 |
| 2016/0093225 | A1* | 3/2016 | Williams | G01S 5/16 |
| | | | | 701/17 |
| 2016/0122038 | A1* | 5/2016 | Fleischman | G06T 7/73 |
| | | | | 701/2 |
| 2016/0196750 | A1* | 7/2016 | Collins | B64C 39/024 |
| | | | | 701/14 |
| 2016/0257401 | A1* | 9/2016 | Buchmueller | B64C 39/024 |
| 2016/0376031 | A1* | 12/2016 | Michalski | B64F 1/36 |
| | | | | 701/15 |
| 2016/0378121 | A1* | 12/2016 | Shue | G05D 1/105 |
| | | | | 701/7 |
| 2017/0045894 | A1* | 2/2017 | Canoy | G05D 1/0676 |
| 2017/0083024 | A1* | 3/2017 | Reijersen Van Buuren | |
| | | | | A01B 69/001 |
| 2017/0197729 | A1* | 7/2017 | Derenick | G08G 5/025 |
| 2017/0283087 | A1* | 10/2017 | McNeill | B64D 45/08 |
| 2017/0313439 | A1* | 11/2017 | Holt | B64C 39/024 |

OTHER PUBLICATIONS

Park, Keunyoung et al., "A Vision based Landing Spot Searching for Unmanned Aerial Vehicle using Satellite Image," IEEE, Informatics, Electronics & Vision (ICIEV), 2015 International Conference, Jun. 15-18, 2015, 6 pages, Fukuoka, Japan.

Atkins, Ella M., "Certifiable Autonomous Flight Management for Unmanned Aircraft Systems," Presentation Slides, Michigan Engineering, 2010, University of Michigan.

Hook, Loyd, et al., Development of a 'where-to-land' decision function for an Expert Piloting System (EPS) for Piloted and Autonomous Air Vehicles (Phase I Results), NASA, Jul. 9-11, 2013, Presentation Slides.

* cited by examiner

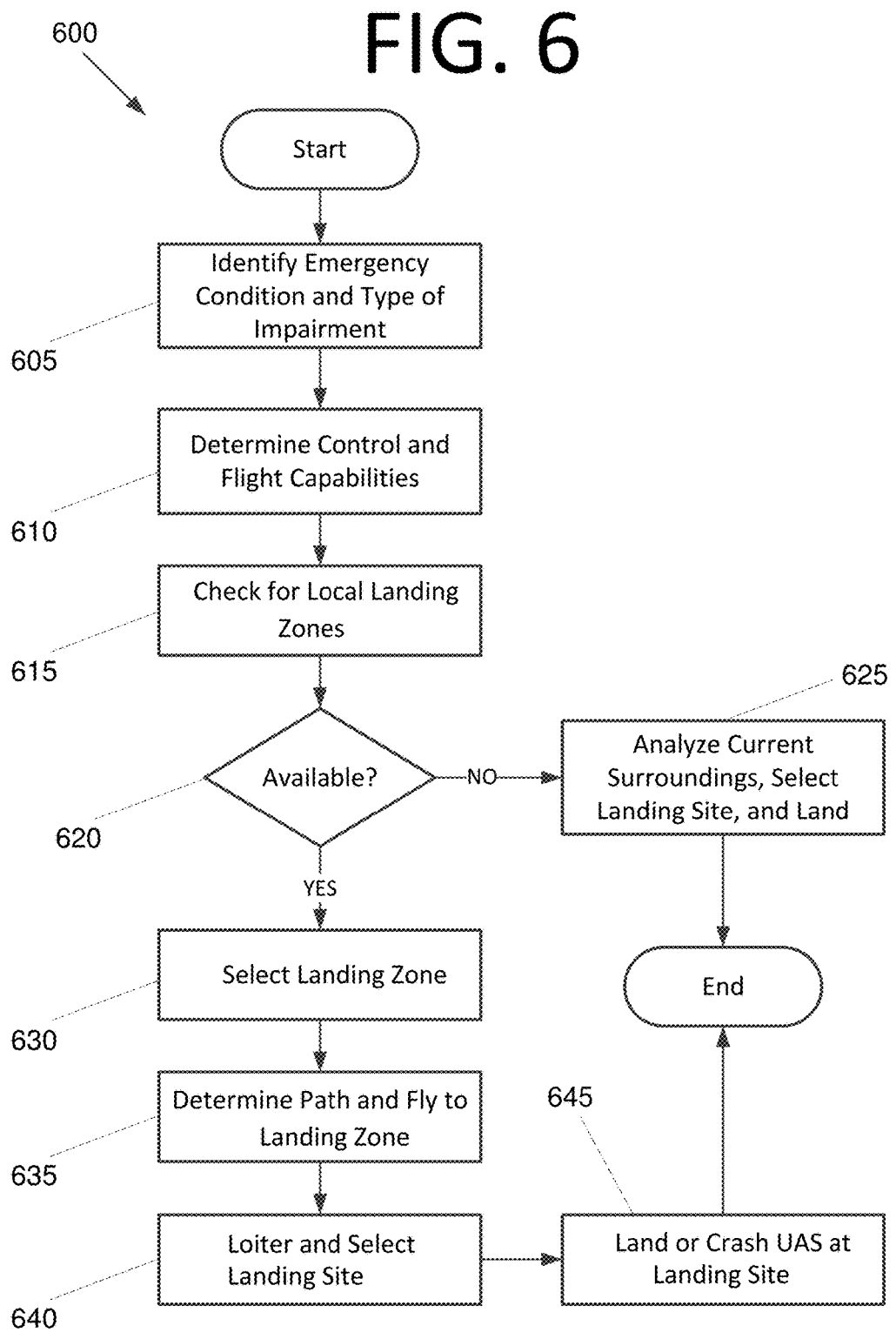

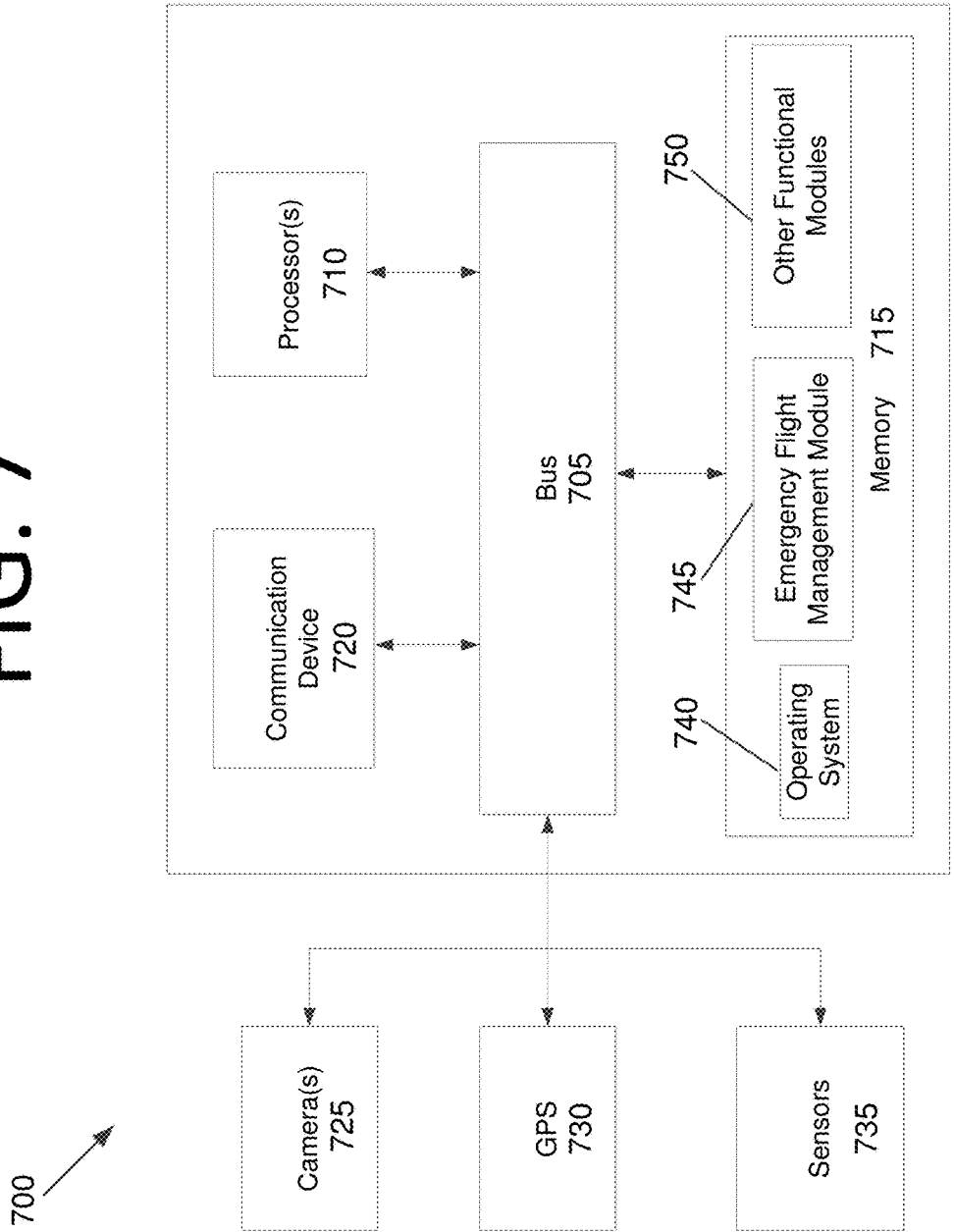

AUTONOMOUS EMERGENCY FLIGHT MANAGEMENT SYSTEM FOR AN UNMANNED AERIAL SYSTEM

CROSS-REFERENCE TO RELATED PATENT APPLICATION(S)

This patent application claims the benefit of and priority to U.S. Provisional Patent Application No. 62/274,816, filed on Jan. 5, 2016, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

The present invention generally relates to emergency flight control, and more specifically, to an autonomous emergency flight management system that finds safe and clear landing sites for unmanned aerial systems (UASs) in emergency situations.

BACKGROUND OF THE INVENTION

As UASs become more prevalent in the National Airspace System (NAS), operations by commercial industry, science missions, and hobbyists are desired to extend to urban environments. The Federal Aviation Administration (FAA) requires proof of safe operations to a very high degree of confidence to authorize use of any aircraft over populated areas. Without a pilot to provide decision support for emergency situations, however, UASs will have to rely on an on-board autonomous emergency management system to select a safe landing site with a landing site selection module, direct the possibly disabled vehicle to that site, and inspect the area to ensure it is clear of people and assets.

Considerable resources are currently being expended to evolve the UAS flight management systems for their intended missions for large UASs (e.g. heavier than 55 pounds). However, there is a need for an improved approach to performing emergency flight management, particularly as UASs become more prevalent and are used for more applications.

BRIEF SUMMARY OF THE INVENTION

Certain embodiments of the present invention may provide solutions to the problems and needs in the art that have not yet been fully identified, appreciated, or solved by conventional emergency flight management systems. For example, some embodiments of the present invention pertain to an autonomous emergency flight management system that finds safe and clear landing sites for UASs in emergency situations. The UAS may then be landed or crashed, depending on its operational capabilities, at the landing site (i.e., landing site). In some embodiments, safe landing sites may be found for small UASs, which are defined as any UAS weighing less than about 50 pounds. This may be particularly beneficial in populated areas. In order to operate in populated areas, UASs should be designed to meet a specific level of reliability to achieve an equivalent level of safety to manned aircraft operations.

Manned aircraft are designed to meet certain levels of reliability to fly over populated areas. The pilot on the aircraft can intervene when required to make a safe emergency landing when needed. The ability of the pilot to do this likely reduces the required level of reliability of the aircraft to fly over populated areas. A similar relationship is anticipated with UASs with the ability to autonomously select, fly-to, verify, and land safely, likely contributing towards overall combined reliability and safety of the vehicle.

Some embodiments support fully autonomous emergency landings to allow UASs to meet the reliability requirements for FAA certification. The system in some embodiments includes a precompiled database of adequate landing sites, along with a vision system that to verifies that the site is adequate at the time of use (i.e., verify the site is where it is supposed to be and that it is clear of people and obstructions). Given the small and relatively low cost nature of small UASs, the system of some embodiments provide beneficial aspects by being small, low cost, and not substantively impacting the payload or performance of the UAS.

In an embodiment, a computer-implemented method includes identifying, by a computing system, an emergency condition and a type of impairment for an unmanned aerial system (UAS). The computer-implemented method also includes determining, by the computing system, control and flight capabilities of the UAS. The computer-implemented method further includes selecting a landing site, by the computing system, and landing or crashing the UAS at the landing site, by the computing system.

In another embodiment, a computer program is embodied on a non-transitory computer-readable medium. The program is configured to cause at least one processor to identify an emergency condition and a type of impairment for a UAS and determine control and flight capabilities of the UAS. When map data is available and at least one landing zone is in the map data, the computer program is also configured to cause the at least one processor to check for a reachable landing zone and select the reachable landing done. The computer program is further configured to cause the at least one processor to determine a path to the landing zone based on the control and flight capabilities of the UAS and control the UAS to travel along the determined path to the landing zone. Additionally, the computer program is configured to cause the at least one processor to select a landing site and land or crash the UAS at the landing site.

In yet another embodiment, an apparatus includes memory storing computer program instructions and at least one processor configured to execute the computer program instructions. The at least one processor is caused to identify an emergency condition and a type of impairment for a UAS and determine control and flight capabilities of the UAS. The at least one processor is also caused to check for a reachable landing zone, determine a path to the landing zone based on the control and flight capabilities of the UAS, and control the UAS to travel along the determined path to the landing zone. The at least one processor is further caused to select a landing site and land or crash the UAS at the landing site.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6 is a flowchart 600 illustrating a process for performing emergency flight control, according to an embodiment of the present invention.

FIG. 7 is a block diagram illustrating a computing system configured to implement an emergency flight management system, according to an embodiment of the present invention.

DETAILED DESCRIPTION OF THE INVENTION

Figure 1:
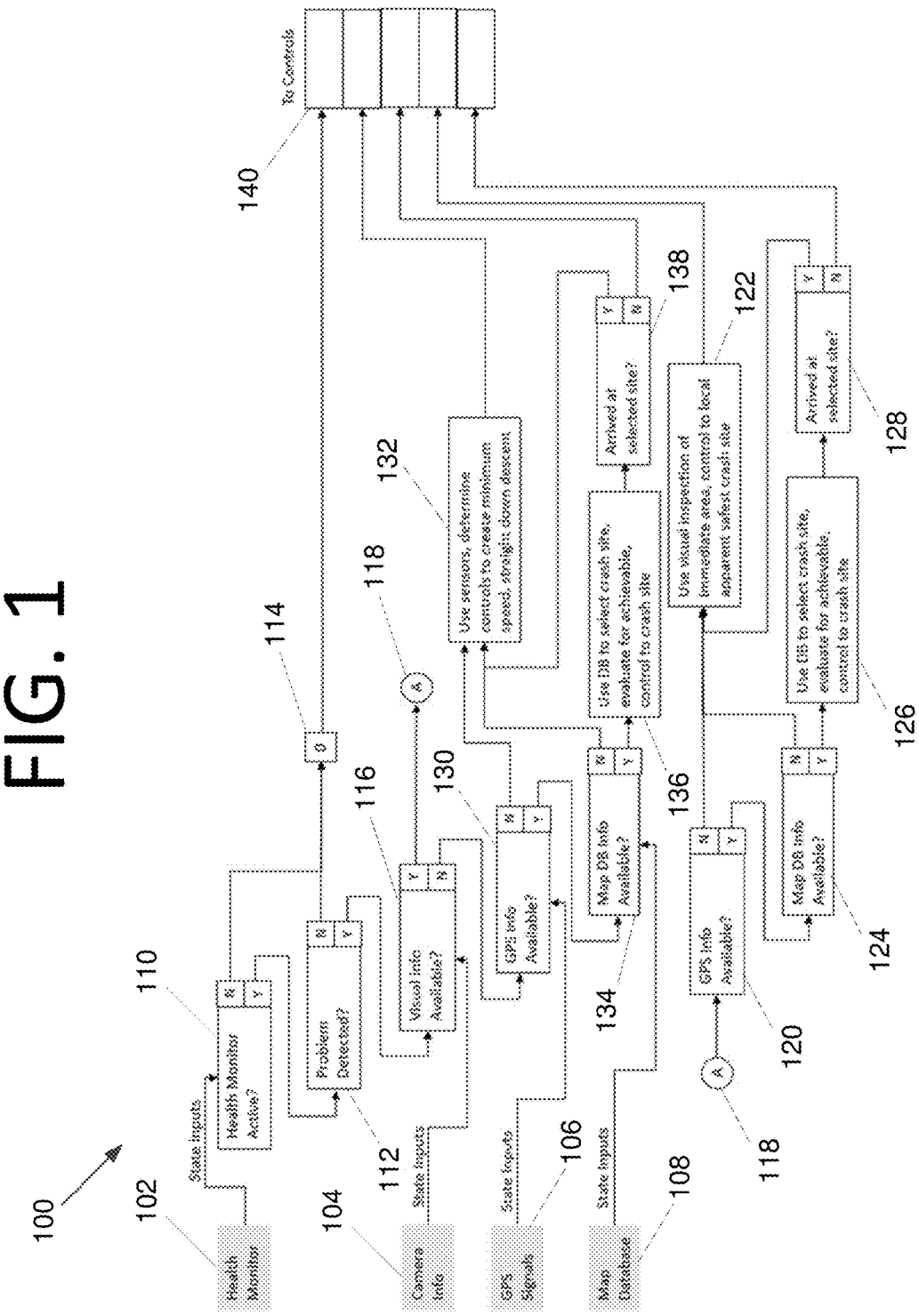
FIG. 1 is a flow diagram illustrating conditional logic of an emergency flight management system, according to an embodiment of the present invention.

Some embodiments of the present invention pertain to an autonomous emergency flight management system that finds safe and clear landing sites for UASs in emergency situations. In some embodiments, emergency flight management software resides on an onboard computing system. The computing system may continuously look at internal databases and input from other systems (e.g., a global positioning system (GPS), camera, compass, radar, sonar, etc.). Naturally, many small UASs will not have all of these systems in order to reduce cost and complexity. The emergency flight management system of some embodiments may make decisions on its own without human intervention. For instance, a database may provide some local likely candidates for landing sites. Information associated with the candidates may include, but is not limited to, latitude, longitude, altitude for top of a building, etc. Position updates may be continuously provided from an autopilot or other suitable system.

The emergency flight management system may also take in inputs from a health management system and a vision system, if they exist. Internally, the emergency flight management system may monitor state of health (e.g., battery health, controllability health, etc.). When the UAS cannot complete mission and/or cannot return home, the emergency flight management system may activate an emergency management mode. In this mode, the emergency flight management system may compare where the position of the UAS is relative to optional landing sites, use internal triaging logic to determine which landing sites are better choices (e.g., less occupied, fewer obstacles, etc.), compare local landing sites to how far the UAS can travel, and quickly lay in a route for the UAS to the landing site.

If the UAS has an onboard camera system, as it approaches the landing site, the emergency flight management system may compare what the camera captures with what it anticipated to find. For instance, if motion inputs indicate people are present, the emergency flight management system may cause the UAS to maneuver so as not to hit people, cars, etc. For instance, in some embodiments, the emergency flight management system may be able to cause the UAS to tactically maneuver about 20 feet to the left or right, etc.

The emergency flight management system may incorporate adaptive controls to enable the UAS to fly with some kind of impairment. For instance, if the UAS is a fixed wing aircraft that can only turn one direction due to an impairment, the emergency flight management system may take that impairment into account such that it only turns in the direction in which it is capable of turning. In other words, the emergency flight management system may change the way the vehicle flies. Other examples include, but are not limited to, when a UAS has one or more rotors or propellers that have failed, the UAS is experiencing erratic yaw, the UAS is not capable of climbing, the UAS is listing to one side due to only partial power in a rotor, etc.

In certain embodiments, the emergency flight management system may fly the UAS home with limited controllability due to its impairment condition. However, this may not be desirable for some applications since this could present more risk. For instance, presence of one impairment could indicate a broader problem, and more impairments may soon present themselves, potentially making the UAS uncontrollable.

Perhaps the most common failure mode is a low battery condition. In that case, the UAS would be able to perform normal flight operations, but only for a limited duration and distance. The UAS may safely set down and, if it possesses the communications capabilities, transmit its landing position to the owner so it can be retrieved. Other failure modes could arise from the UAS losing operation of a rotor or two, an uncommanded cargo shift, failed control surfaces, failed servo(s), GPS unit failure, failure of sensors for airspeed or altitude, etc. Some embodiments are able to detect the type of failure condition, determine the type of control that remains available, and adjust control of the UAS during emergency flight mode accordingly.

Some embodiments may reduce the FAA's demonstrated required probability of failure minimum from 0.999999 (one in a million) to about 0.999 (one in ten thousand). This would represent a tremendous cost savings to vehicle designers at a minimum, and may allow an otherwise uncertifiable vehicle to be certified. As noted above, some embodiments are incorporated into small UASs. However, certain embodiments may be applied to UASs of any size without deviating from the scope of the invention.

In some embodiments, the flight computer includes a generic Odroid™, the camera is a web cam, and the autopilot is a Pixhawk™ with a pre-integrated GPS and compass. The system may also include the application programming interface (API) software system provided by the vendor of the Pixhawk™, DIYDrones™, called "Mavlink™." The Mavlink™ interface software is the same system that allows the DIYDrone™ ground station to communicate with the vehicle during flight through a radio link.

The system for this embodiment may reside in a new software package that, for flight testing, was coded as a user-defined component to operate within the Mavlink™ framework. However, while some embodiments use Mavlink™, other software and/or hardware may be used without deviating from the scope of the invention.

During regular flight operation, the system may continuously monitor the GPS location (including altitude) and the health state of the vehicle, which are provided as inputs. Internally, the system may have a precompiled database of known optional landing/landing sites that are considered to be candidates for emergency landings. These landing sites may have an associated favorability rating to allow the system to differentiate between excellent and reliable locations and those locations which should only be used as a last resort. Key parameters associated with reaching each of the sites (power, lift, speed, etc.) may be computed by the system in preparation for an emergency as the vehicle conducts its normal flight.

System engagement may be triggered when an input from a vehicle health monitoring system is perceived to indicate that the vehicle cannot achieve its original flight plan. This recognition of capability may be part of the system's algorithms. For example, the battery may have unexpectedly fallen below the requirement for level flight, or the fuel flow may indicate a tank leak with insufficient fuel to the destination. When the system engages, it may consult the internal results previously computed for each of the optional landing sites to select the best landing site within the range of the disabled vehicle and initiate navigation of the vehicle to that location.

As the vehicle closes on the location, the camera system may deliver imaging data to the vision processing within the system. This vision processing may be primarily used to inspect the targeted site to ensure that it is still safe for landing (i.e., no people, movement, or obstructions in the target area). This vision capability may include both standard and infrared vision, with either or both activated to achieve an optimum integrated result. If the targeted area is not safe, the system may attempt to select another safe site from the internal database and proceed to that site. This cycle of selection, direction, and inspection may continue until a safe site is reached. If at any time the vehicle performance will not allow it to reach a known site, the vision capability may be used to tactically steer away from humans or obstructions to the extent possible.

Advantages of some embodiments include, but are not limited to, ability to perform emergency flight management effectively on small, lower cost UASs. Most emergency management system applications are designed to reside on large vehicles that can carry substantial payload and provide very high resolution results. These systems are unsuitable for small UASs with limited payload capacity, and would also be cost prohibitive to the hobbyist or small commercial operator market. The system of some embodiments targets adequate results using relatively inexpensive support hardware, and is designed to operate with autopilot systems favored by the small UAS market. By setting this use case, the resulting product is expected to have broad application and marketability.

The flight management component of some embodiments is staged independently from the vision inspection component to allow continued testing for reliable detection of humans in the targeted landing area. Image processing may be pursued with various methods. In some embodiments, image data can be evaluated by adapting traditional image processing techniques for low-end and low-speed processors by limiting the functionality to a small subset of the traditional library. In certain embodiments, image data can be evaluated by treating the image as a numeric matrix and correlate algorithmic characteristics of the matrix to the probability of movement or large object presence in the area of interest.

FIG. 1 is a flow diagram illustrating conditional logic of an emergency flight management system 100, according to an embodiment of the present invention. Emergency flight management system 100 includes a flight control computer and receives various state inputs, including health monitoring module information 102, camera information 104, GPS signal information 106, and map database information 108. If the health monitor is not active at 110, or the health monitoring module is active and a problem is not detected at 112, a state bit 114 is set to zero and sent to the controls in emergency flight management information 140. However, any bit setting, byte, bytes, or any other desired amount and/or type of digital information may be used to provide status indications without deviating from the scope of the invention.

If the health monitoring module is active at 110 and a problem is detected at 112, various information is provided in emergency flight management information 140 depending on what capabilities are available from the UAS. For instance, if visual information is available in camera information 104 at 116, the process proceeds from indicator 118 to step 120. If GPS is not available at 120, or if GPS information is available at 120 but map database information is not available at 124, if possible, visual inspection of the immediate area is performed, and the UAS is controlled to locate the local apparent safest "crash site" at 122.

If GPS and map information are available at 120 and 124, the map database is used to the map database is used to select a crash site with a landing site selection module, and an evaluation is made as to whether control to the crash site can be achieved at 126. However, it should be noted that crash site in this context does not necessarily mean that the UAS crashes and is destroyed. If the UAS can reach the site and land softly, it will do so. When the UAS has not arrived at the crash site at 128, this information is provided to flight control systems in emergency flight management information 140. When the UAS reaches the crash site at 128, this information is used at step 122 to perform a visual inspection and control the UAS to the crash site.

Similar to steps 12, 122, 124, 126, 128 above, if GPS information is not available at 130, or if GPS information is available at 130 but map database information is not available at 134, other sensors, such as infrared, lasers, radar, sonar, etc. (if one, some or all of these are available), may be used to determine controls to create a minimum speed, straight down descent at 132. If GPS information is available at 130 and map database information is available at 134, the map database is used to select a crash site, and an evaluation is made as to whether control to the crash site can be achieved at 136. When the UAS has not arrived at the crash site, this information is provided to flight control systems in emergency flight management information 140. When the UAS reaches the crash site at 138, this information is used at step 132 to make the determination that it is time to land or crash.

Figure 2:
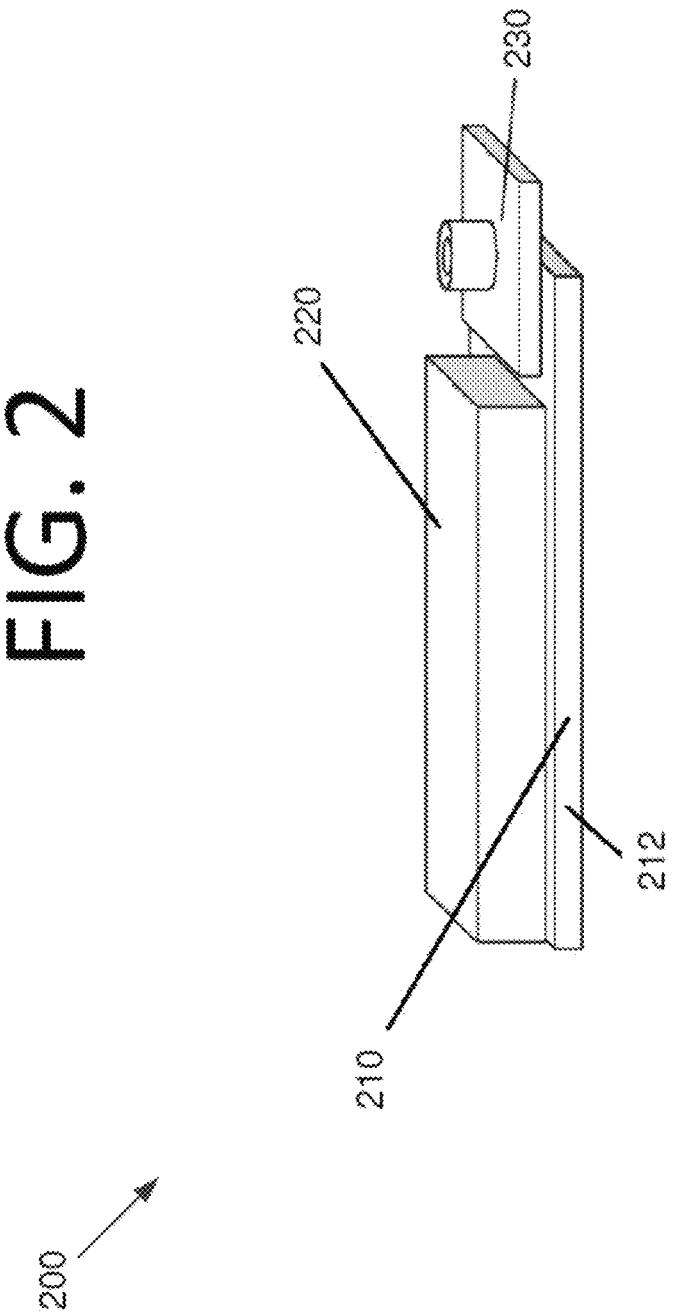
FIG. 2 is a side perspective view illustrating an embodiment of an emergency flight management system of the present invention.

FIG. 2 is a side perspective view illustrating commercial off-the-shelf (COTS) hardware 200 that may be used to implement an emergency flight management system, according to an embodiment of the present invention. While emergency flight management is implemented entirely in software in this embodiment, in other embodiments, a combination of software and custom hardware, or an implementation entirely in custom hardware, may be used without deviating from the scope of the invention. However, deviating from a software-based solution running on COTS hardware will likely increase the cost of the system.

In this embodiment, a flight computer 210, a autopilot module 220, and a camera board 330 are used. Such hardware may be standard equipment in many small UASs. However, unlike stock UASs, in this embodiment, "safe to land" algorithms 212 implementing logic, such as that depicted in FIG. 1 and/or described elsewhere herein, are used. The system uses this combination of hardware and software to choose landing site options and visually inspect the landing site to ensure that it is free of people, vehicles, and/or other hazards to verify that it is indeed "safe to land."

Figure 3:
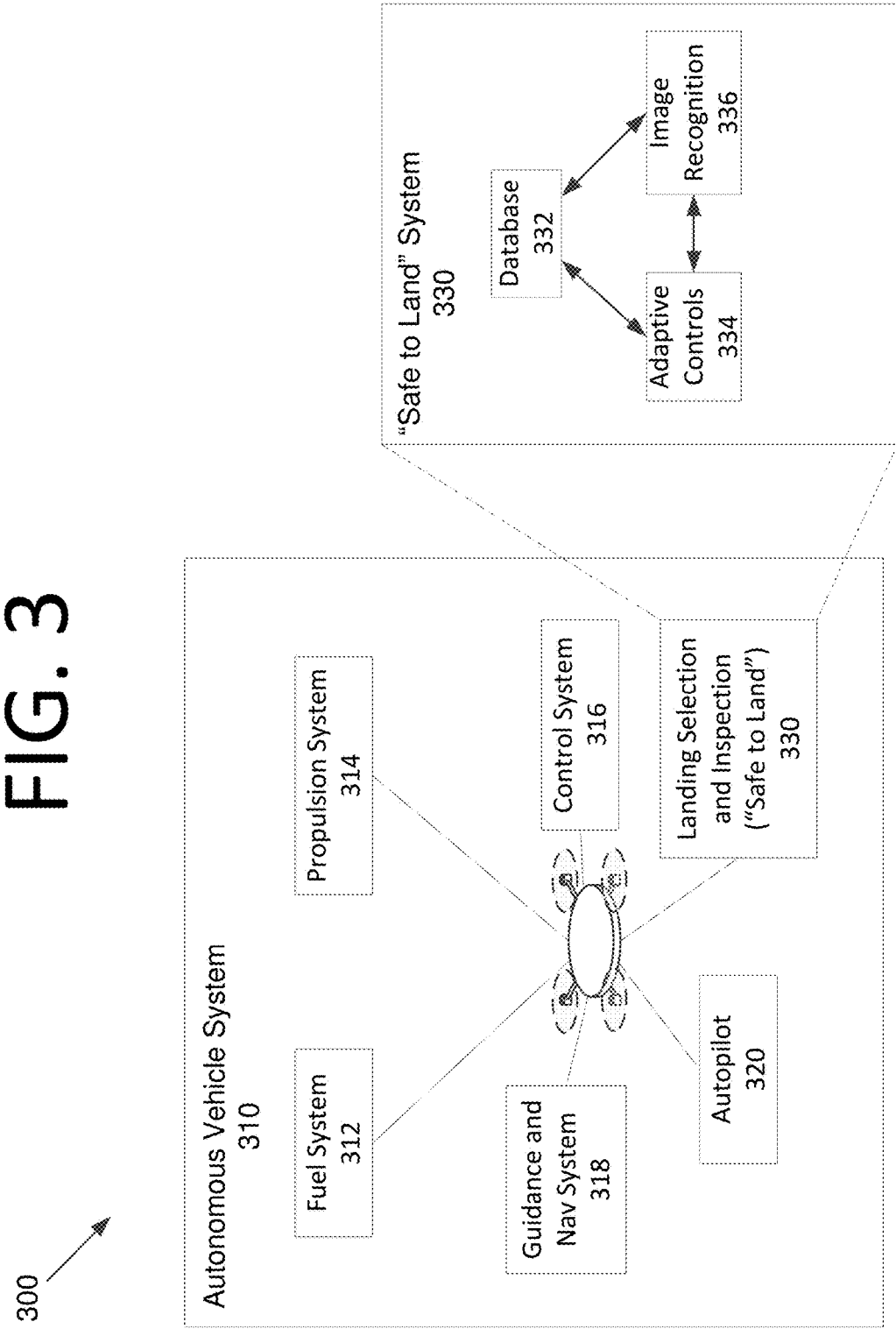
FIG. 3 is an architectural diagram illustrating a UAS emergency flight management system, according to an embodiment of the present invention.

FIG. 3 is an architectural diagram illustrating a UAS emergency flight management system 300, according to an embodiment of the present invention. UAS emergency flight management system 300 includes an autonomous vehicle system 310 that includes a fuel system 312 (e.g., battery, liquid fuel, etc.), a propulsion system 314 (e.g., propellers, rotors, engines, etc.), a control system 316, a guidance and navigation system 318, an autopilot 320, and a landing and inspection ("safe to land") system 330. "Safe to land" system 330 includes a database 332, active controls 334, and image recognition 336. These components communicate information with one another such that adaptive controls 334 obtain the information they need to determine whether to engage emergency flight mode, and if so, to facilitate guidance and control of the UAS to a safe landing site.

In some embodiments, before descending to the selected landing site, the emergency flight management system confirms that the database location matches the real-world location (i.e., that the database is current and accurate), and makes sure the landing site is not occupied (e.g., using camera(s) and/or sensors). When the landing zone is not clear, the system may select an alternate landing zone and verify that it is clear of people and obstacles.

Consider the example where a UAS is deployed to deliver a product to a customer and is over a residential or commercial area (e.g., a home, a business, a busy road, etc.). The UAS experiences failure of an important system (e.g., a control surface, a rotor, etc.), and the UAS must find a safe area to land (or crash). Since the UAS is over a high-risk zone, it deems that the current location is not safe to land. As a next option, a parking lot is identified nearby. However, the parking lot is full of cars and is relatively obstructed. Due to the risk of damaging cars, and possibly striking people, the UAS deems that this is an intermediate risk zone and decides to seek another zone. The UAS then evaluates another location which is a park. The location is verified with a landing site verifier module, and is free of people and obstacles, so the UAS selects that site and lands or crashes. Given modern processing speeds, the UAS can make the landing site determination quickly, as well as use its available sensors to avoid unexpected obstacles, such as people, pets, cars, unexpected objects, etc.

Sometimes, the UAS may not have the option to find a low risk zone. In that case, the UAS may seek to identify the lowest risk zone it can reach and land or crash in that zone. For instance, it may be preferable to land in a parking lot rather than a residential neighborhood, or if only high risk zones are available, to use sensors to avoid people, to land on a sidewalk rather than a street, or vice versa.

Figure 4:
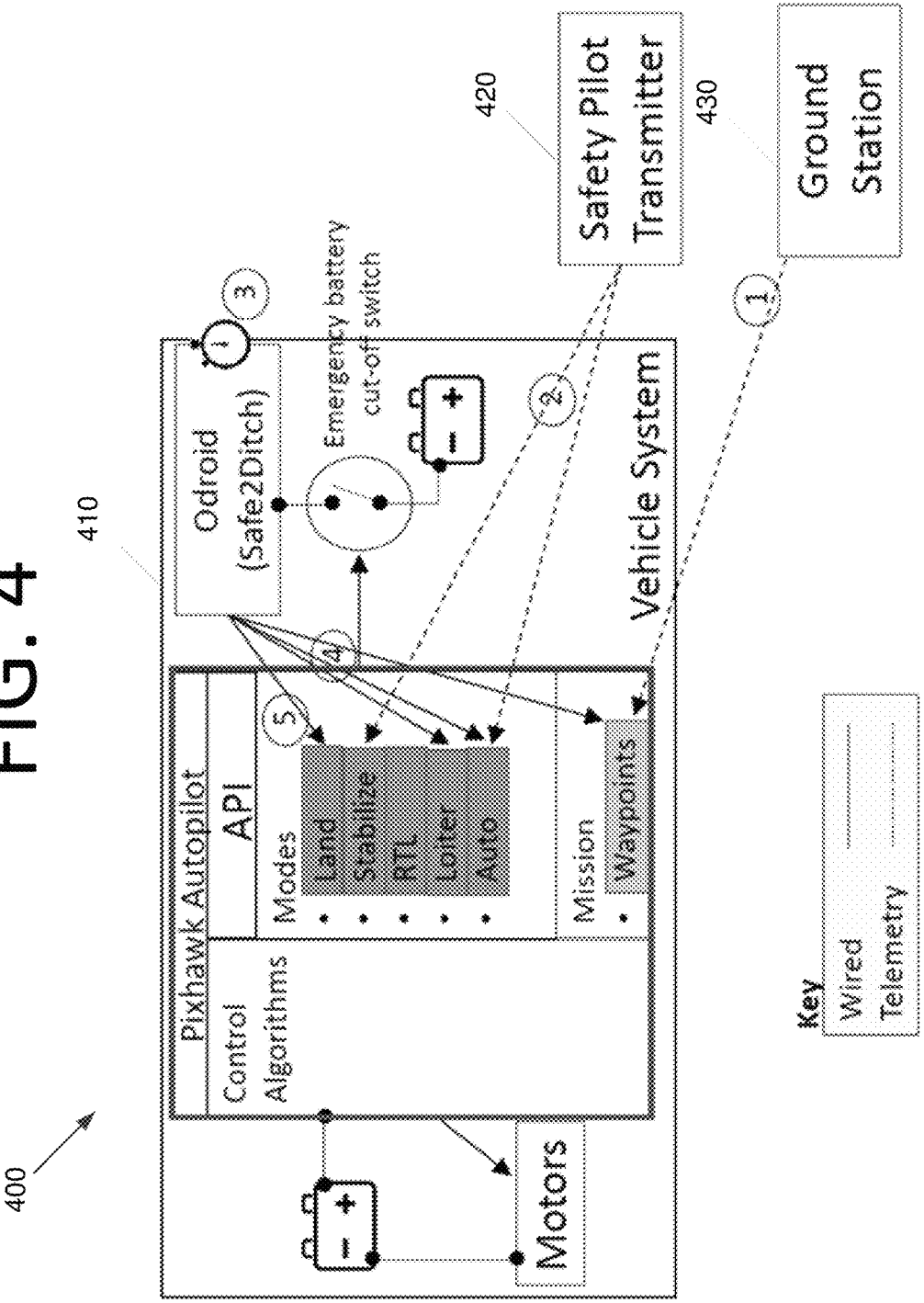
FIG. 4 is an architectural diagram illustrating a prototype UAS emergency flight management system and test sequence, according to an embodiment of the present invention.

FIG. 4 is an architectural diagram illustrating a prototype UAS emergency flight management test system 400 and test sequence, according to an embodiment of the present invention. Test system 400 includes a UAS vehicle system 410, a safety pilot transmitter 420, and a ground station 430. The sequence in this embodiment is as follows (and as numbered in FIG. 4): (1) ground station 430 sets the initial mission; (2) the safety pilot causes UAS vehicle system 410 to take off via safety transmitter 420 using STABILIZE mode and selects AUTO mode to fly the mission; (3) at a preset time after AUTO Safe2Landing engages; (4) Safe2Landing engages LOITER mode, selects a landing site, sets a mission to the landing site, and reengages AUTO mode; (5) Upon UAS vehicle system 410 reaching the landing site, Safe2Landing engages LOITER mode, inspects the landing site, and then engages LAND mode if the landing site is clear. It should be noted that STABILIZE mode causes UAS vehicle system 410 to take off and hover, AUTO mode causes UAS vehicle system 410 to fly to a mission location or fly a mission route using its autopilot, LOITER mode causes UAS vehicle system 410 to hover or move around searching for a suitable location to land, and LAND mode causes UAS vehicle system 410 to safely set down or to crash, depending on the operational state of UAS vehicle system 410.

Figure 5:
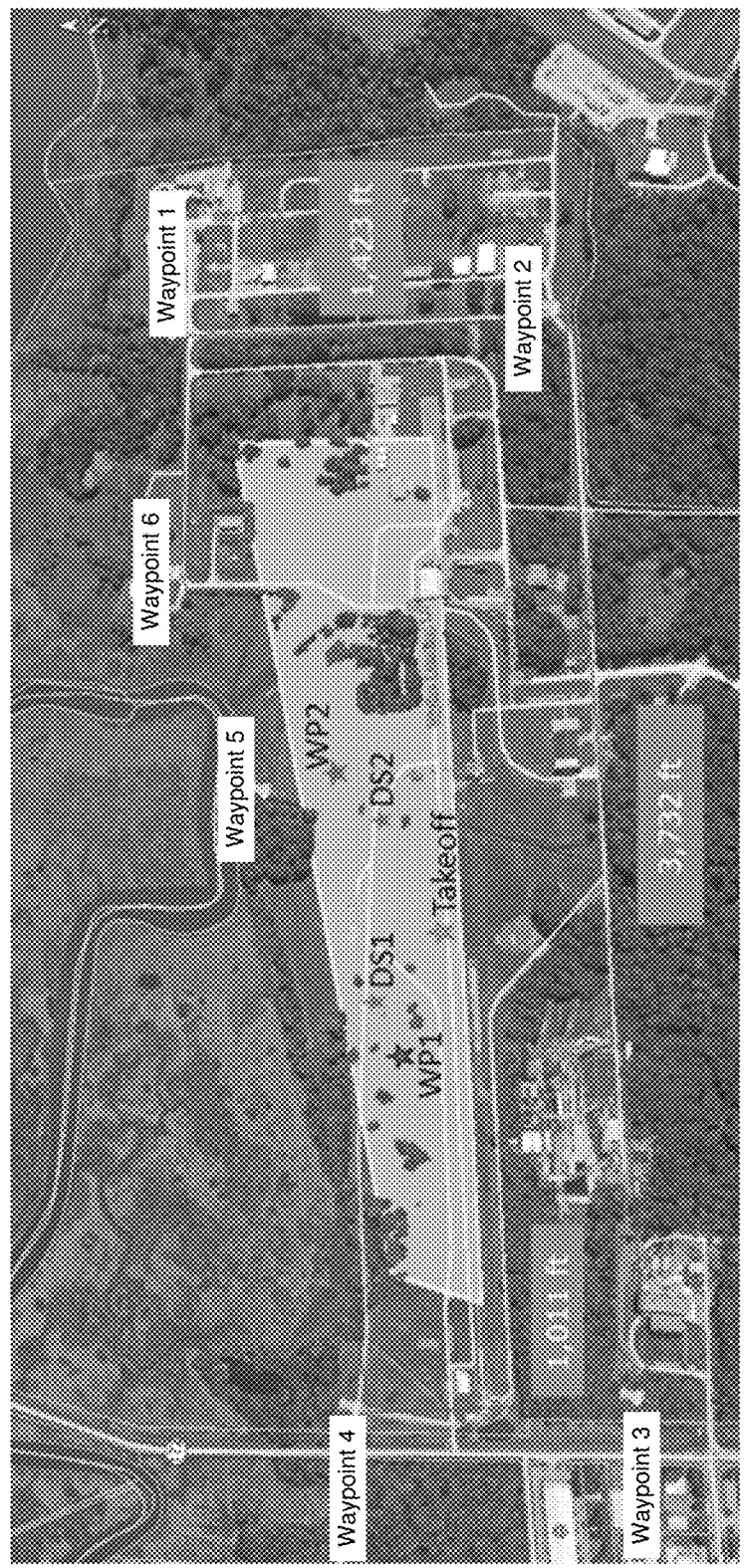
FIG. 5 is a computer-generated map image with overlays for a landing zone, flight path waypoints, and landing sites, according to an embodiment of the present invention.

FIG. 5 is a computer-generated map image 500 with overlays for a landing zone, flight path waypoints, and landing sites, according to an embodiment of the present invention. After taking off some the site labeled "Takeoff," the UAS travels from Waypoint 1 to Waypoint 6 in sequence, and then travels to Waypoint 1 again and repeats the flight sequence. After a predetermined amount of time has passed, an emergency situation is simulated, and the UAS looks for a potential safe landing zone. The UAS identifies the lighter shaded zone in the middle of the image, which is mostly a field, as a potential safe landing zone and travels to the done to loiter and then land at a landing site. Two tests are shown in FIG. 5. In the first test, the UAS traveled to a loiter position at WP1 and then landed at landing site DS1. In the second test, the UAS traveled to a loiter position at WP2 and then landed at landing site DS2. As can be seen from image 500, both of these landing sites appear to be clear of people and obstacles in the map. However, since the presence of people, animals, and objects may change, the UAS still loiters first and analyzes its current surroundings before selecting a landing site and landing.

As discussed above, in some embodiments, the emergency flight management system may have access to a pre-compiled database of potential landing zones. These zones may be identified from satellite image data, and may further be analyzed at different times of day to determine the likelihood of the presence of people, pets, objects, or any other obstacles. While any suitable algorithm may be used, the algorithm of some embodiments may be given by:

$$\frac{\text{obstacle area}}{\text{total zone area}}$$

at a given time of day or time range (e.g., 12:00 pm to 1:00 pm, 12:00 pm to 6:00 pm, etc.). Thus, if a first zone yields a value of 7.4% and a second zone yields a value of 4.2% at the current time, the second zone will be selected. In some embodiments, the zone with the lowest value that the UAS will reach will be selected. In certain embodiments, a closest zone that falls below a predetermined maximum threshold (e.g., 5%) may be selected. When no zone is available below this threshold, the emergency flight management system may select the reachable zone with the lowest probability, even if this zone would otherwise be deemed to be high-risk.

FIG. 6 is a flowchart 600 illustrating a process for performing emergency flight control, according to an embodiment of the present invention. The process begins with identifying an emergency condition and the type of impairment at 605. Per the above, this could be due to low battery or fuel, a failed control surface, a failed rotor, propeller, or engine, failure of sensor or navigation systems, any combination thereof, etc. The control and flight capabilities of the UAS are then determined at 610. In other words, the emergency flight management system determines the way in which the UAS is capable of flying, how far it can fly, whether it is capable of landing or must crash, etc.

The emergency flight management system then checks for local landing zones at 615 using map data from a database. If the map data and/or a local landing zone are not available, the emergency flight management system analyzes its current surroundings (e.g., via a camera, if possible), selects a landing site that is free of obstacles, and lands or crashes. Depending on the severity of the impairment, sensor data may be entirely unavailable. If no sensor data is available, the emergency flight management system may try to set the UAS down as slowly as possible beneath its current position, potentially emitting a sound, if possible, to alert any individuals or animals under the UAS. However, if more capabilities are available, the emergency flight management system may use those capabilities to increase the probability of a safe landing/crash.

If one or more landing zones are available at 620, the emergency flight management system selects a landing zone at 630. This may be based on proximity, lowest determined probability of obstacles at the time of day, or any other suitable approach without deviating from the scope of the invention. The emergency flight management system then determines a path to the landing zone and the UAS begins to fly to the landing zone at 635. However, if at any time while traveling to the landing zone the emergency flight management system determines that reaching the landing zone is no longer possible due to further failure or any other unexpected condition, the emergency flight management system may seek to set the UAS down as discussed above with respect to step 625.

Upon reaching the landing zone (and indeed, perhaps a location within the landing zone that has been determined to potentially be clear based on map data), the UAS loiters and selects a landing site at 640. In order to select a safe landing site, the UAS may use camera and/or sensor information (e.g., sonar, radar, laser range finding, infrared, etc.). Obstacles may be detected by comparing map data to what is seen by the camera, information detected by the sensors, etc. A site may be selected that is at least a predetermined distance from any detected obstacle. In some embodiments, motion of obstacles may be take into account. For instance, if a car is moving at a certain speed and in a certain direction, its potential path may be determined. Once the landing site has been selected, the emergency flight management system then lands or crashes the UAS at the landing site.

FIG. 7 is a block diagram illustrating a computing system 700 configured to implement an emergency flight management system, according to an embodiment of the present invention. Computing system 700 includes a bus 705 or other communication mechanism for communicating information, and processor(s) 710 coupled to bus 705 for processing information. Processor(s) 710 may be any type of general or specific purpose processor, including a central processing unit (CPU), application specific integrated circuit (ASIC), etc. Processor(s) 710 may also have multiple processing cores, and at least some of the cores may be configured to perform specific functions. Multi-parallel processing may be used in some embodiments. Computing system 700 further includes a memory 715 for storing information and instructions to be executed by processor(s) 710. Memory 715 can be comprised of any combination of random access memory (RAM), read only memory (ROM), flash memory, cache, static storage such as a magnetic or optical disk, or any other types of non-transitory computer-readable media or combinations thereof. Additionally, computing system 700 includes a communication device 720, such as a transceiver and antenna, to wirelessly provide access to a communications network.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 710 are further coupled via bus 705 to a camera 725, GPS 730, and sensors 735. Sensors 735 may include sonar, radar, laser range finding, an altimeter, gyroscope(s), infrared, or any combination thereof. Less complex and less expensive systems will likely have less advanced sensor capabilities.

Memory 715 stores software modules that provide functionality when executed by processor(s) 710. The modules include an operating system 740 for computing system 700. The modules further include an emergency flight management module 745 that is configured to perform emergency flight control using any of the approaches discussed herein or derivatives thereof. Computing system 700 may include one or more additional functional modules 750 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 1 and 6 may be performed by a computer program, encoding instructions for the nonlinear adaptive processor to perform at least the processes described in FIGS. 1 and 6, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 1 and 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An autonomous emergency flight management system for an unmanned aerial system (UAS) comprising:
    a landing site selection module programmed with a first flight plan and disposed on said UAS, wherein said landing site selection module comprises a database of pre-programmed landing sites, wherein said landing site selection module comprises a proposed image of a first landing site for said first flight plan;
    a health monitoring module disposed on said UAS, wherein said health monitoring module comprises a UAS location detector, a UAS fuel detector, and an impairment detector;
    a landing site verifier module disposed on said UAS, wherein said landing site verifier module is in communication with a camera disposed on said UAS that produces an actual image of a first landing site, wherein said landing site verifier module compares the proposed image of the first landing site to the actual image of the first landing site to determine the existence of a deviation;
    a flight control computer disposed on said UAS in communication with said landing site selection module, said health monitoring module and said landing site verifier module to determine viability of said first flight plan,
    wherein said flight control computer has capability to detect an anomaly in said first flight plan from said landing site selection module, said health monitoring module or said landing site verifier, and wherein said flight control computer will calculate a second flight plan if said anomaly is detected indicating that said first flight plan is not achievable.

2. The autonomous emergency flight management system for the UAS of claim 1, wherein said UAS fuel detector comprises a battery voltage detector.

3. The autonomous emergency flight management system for the UAS of claim 1, wherein said UAS fuel detector comprises a battery usage rate.

4. The autonomous emergency flight management system for the UAS of claim 1, wherein said UAS location detector provides a latitude, a longitude and an altitude of the UAS.

5. The autonomous emergency flight management system for the UAS of claim 1, wherein said UAS location detector provides a latitude rate, a longitude rate and an altitude rate of the UAS.

6. The autonomous emergency flight management system for the UAS of claim 1, wherein said UAS location detector provides a roll, pitch and yaw of the UAS.

7. The autonomous emergency flight management system for the UAS of claim 1, wherein said UAS location detector provides a roll rate, a pitch rate and a yaw rate of the UAS.

8. The autonomous emergency flight management system for the UAS of claim 1, wherein the deviation comprises a person, an animal or a vehicle.

9. The autonomous emergency flight management system for the UAS of claim 1, wherein the database of landing sites comprises a latitude and longitude of a landing site, a size descriptor and an altitude value.

10. The autonomous emergency flight management system for the UAS of claim 1, wherein the impairment detector has the capability to detect an impairment, and wherein the impairment comprises a failed or failing control surface, a failed or failing rotor, a failed or failing propeller, a failed or failing engine, a failed or failing sensor, a failed or failing navigation system, or any combination thereof.

11. The autonomous emergency flight management system for the UAS of claim 1, further comprising a sound emitting device in communication with the flight control computer, wherein said sound emitting device has the capability to emit a sound prior to landing said UAS.

12. The autonomous emergency flight management system for the UAS of claim 1, wherein the second flight plan is determined by selecting a second landing site that is at least a predetermined distance from an obstacle that would interfere with a safe landing.

13. The autonomous emergency flight management system for the UAS of claim 12, where said obstacle comprises a person, an animal, a vehicle, or vegetation.

14. The autonomous emergency flight management system for the UAS of claim 13, wherein flight control computer has the capability to make an assessment of risk associated with said obstacle, and determine said second flight plan based on said assessment.

15. An autonomous emergency flight management system for an unmanned aerial system (UAS) comprising:
 a landing site selection module programmed with a first flight plan and disposed on said UAS, wherein said landing site selection module comprises a database of pre-programmed landing sites, wherein said landing site selection module comprises a proposed image of a first landing site for said first flight plan;
 a health monitoring module disposed on said UAS, wherein said health monitoring module comprises a UAS location detector, a UAS fuel detector, and impairment detector;
 a landing site verifier module disposed on said UAS, wherein said landing site verifier module is in communication with a camera disposed on said UAS that produces an actual image of a first landing site, wherein said landing site verifier module compares the proposed image of the first landing site to the actual image of the first landing site to determine the existence of a deviation;
 a flight control computer disposed on said UAS in communication with said landing site selection module, said health monitoring module and said landing site verifier module to determine viability of said first flight plan,
 wherein said flight control computer has capability to detect an anomaly in said first flight plan from said landing site selection module, said health monitoring module or said landing site verifier, and wherein said flight control computer will calculate a second flight plan if said anomaly is detected indicating that said first flight plan is not achievable, and wherein said second flight plan is determined by selecting a second landing site that is at least a predetermined distance from an obstacle that would interfere with a safe landing.

16. The autonomous emergency flight management system for the UAS of claim 15, where said obstacle comprises a person, an animal, a vehicle, or vegetation.

17. The autonomous emergency flight management system for the UAS of claim 16, further comprising a sound emitting device in communication with the flight control computer, wherein said sound emitting device has the capability to emit a warning sound prior to landing said UAS.

18. The autonomous emergency flight management system for the UAS of claim 17, wherein said UAS fuel detector comprises a battery voltage detector.

19. The autonomous emergency flight management system for the UAS of claim 18, wherein said UAS fuel detector comprises a battery usage rate.

20. The autonomous emergency flight management system for the UAS of claim 19, wherein the impairment detector has the capability to detect an impairment, and wherein the impairment comprises a failed or failing control surface, a failed or failing rotor, a failed or failing propeller, a failed or failing engine, a failed or failing sensor, a failed or failing navigation system, or any combination thereof.

* * * * *